US008547416B2

(12) United States Patent
Ozawa

(10) Patent No.: US 8,547,416 B2
(45) Date of Patent: Oct. 1, 2013

(54) SIGNAL PROCESSING APPARATUS, SIGNAL PROCESSING METHOD, PROGRAM, AND RECORDING MEDIUM FOR ENHANCING VOICE

(75) Inventor: Kazuhiko Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1808 days.

(21) Appl. No.: 11/474,982

(22) Filed: Jun. 27, 2006

(65) Prior Publication Data
US 2006/0291816 A1 Dec. 28, 2006

(30) Foreign Application Priority Data
Jun. 28, 2005 (JP) ................................. 2005-187700

(51) Int. Cl.
*H04N 7/14* (2006.01)
*H04N 5/225* (2006.01)
(52) U.S. Cl.
USPC .................. 348/14.16; 348/231.6; 348/231.3; 348/169
(58) Field of Classification Search
USPC ......... 348/14.05, 14.16, 169, 231.4; 381/310
See application file for complete search history.

(56) References Cited

U.S. PATENT DOCUMENTS

| | | | | |
|---|---|---|---|---|
| 5,548,346 A * | 8/1996 | Mimura et al. | ............... | 348/738 |
| 5,596,645 A * | 1/1997 | Fujimori | ........................ | 381/17 |
| 6,005,610 A * | 12/1999 | Pingali | ........................... | 348/169 |
| 6,593,956 B1 * | 7/2003 | Potts et al. | ................ | 348/14.09 |
| 6,757,397 B1 * | 6/2004 | Buecher et al. | ............... | 381/122 |
| 7,035,418 B1 * | 4/2006 | Okuno et al. | ................ | 381/310 |
| 7,130,446 B2 * | 10/2006 | Rui et al. | ...................... | 382/103 |
| 7,171,025 B2 * | 1/2007 | Rui et al. | ...................... | 382/103 |
| 7,428,315 B2 * | 9/2008 | Rui et al. | ...................... | 382/103 |
| 7,433,495 B2 * | 10/2008 | Rui et al. | ...................... | 382/103 |
| 7,536,029 B2 * | 5/2009 | Choi et al. | .................... | 382/103 |
| 7,646,372 B2 * | 1/2010 | Marks et al. | .................. | 345/156 |
| 7,692,685 B2 * | 4/2010 | Beal et al. | ...................... | 348/169 |
| 7,874,917 B2 * | 1/2011 | Marks et al. | .................... | 463/36 |
| 2004/0028260 A1 * | 2/2004 | Higaki et al. | ................. | 382/118 |

(Continued)

FOREIGN PATENT DOCUMENTS

| | | |
|---|---|---|
| JP | 09-200601 A | 7/1997 |
| JP | 11-098383 A | 4/1999 |

(Continued)

OTHER PUBLICATIONS

Japanese Office Action issued Oct. 8, 2009 for corresponding Japanese Application No. 2005-187700.

*Primary Examiner* — Sinh Tran
*Assistant Examiner* — Selam Gebriel
(74) *Attorney, Agent, or Firm* — Rader, Fishman & Grauer PLLC

(57) ABSTRACT

A signal processing apparatus processing a video signal and an audio signal in synchronization with the video signal includes generating means for generating information indicating a probability of a certain subject appearing in the image on the basis of the video signal that is input; determining means for determining whether the certain subject appears in the image on the basis of the information generated by the generating means; and directional characteristic varying means for, if the determining means determines that the certain subject appears in the image, varying a directional characteristic of the audio signal so as to increase the level of the audio signal collected from the direction of the subject and/or to decrease the levels of the audio signals collected from directions other than the direction of the subject.

13 Claims, 15 Drawing Sheets

(56) References Cited

U.S. PATENT DOCUMENTS

| | | | |
|---|---|---|---|
| 2005/0099511 A1* | 5/2005 | Cazier | 348/231.4 |
| 2005/0140810 A1* | 6/2005 | Ozawa | 348/333.02 |
| 2005/0182503 A1* | 8/2005 | Lin et al. | 700/94 |
| 2006/0195858 A1* | 8/2006 | Takahashi et al. | 725/19 |
| 2010/0302401 A1* | 12/2010 | Oku et al. | 348/222.1 |

FOREIGN PATENT DOCUMENTS

| | | |
|---|---|---|
| JP | 2000-299842 A | 10/2000 |
| JP | 2001-008285 A | 1/2001 |
| JP | 2001-352530 A | 12/2001 |
| JP | 2005-151042 A | 6/2005 |

* cited by examiner

SIGNAL PROCESSING APPARATUS, SIGNAL PROCESSING METHOD, PROGRAM, AND RECORDING MEDIUM FOR ENHANCING VOICE

CROSS REFERENCES TO RELATED APPLICATIONS

The present invention contains subject matter related to Japanese Patent Application JP 2005-187700 filed in the Japanese Patent Office on Jun. 28, 2005, the entire contents of which are incorporated herein by reference.

BACKGROUND OF THE INVENTION

1. Field of the Invention

The present invention relates to signal processing apparatuses, signal processing methods, programs, and recording media. More particularly, the present invention relates to a signal processing apparatus, a signal processing method, a program, and a recording medium, which are capable of enhancing a voice emitted from a certain subject in an image that is captured.

2. Description of the Related Art

Technologies involved in extraction of audio signals have been increasingly improved, in addition to auto-focus functions, in devices including video cameras in recent years. For example, a technology of extracting an audio signal from a sound source in front of a screen and enhancing the extracted audio signal is disclosed in Japanese Unexamined Patent Application Publication No. 2001-8285. An object of this technology is to clearly record and reproduce a voice emitted from a subject to be shot on the basis of the fact that the subject is positioned in front of the screen in most cases in devices, such as video cameras, which record and reproduce audio signals along with video signals.

In addition, Japanese Unexamined Patent Application Publication No. 2000-299842 discloses an apparatus capable of recording and reproducing sounds from all the directions in the sound field, in addition to images, in and from multiple channels to allow a viewer to preview realistic video and audio.

SUMMARY OF THE INVENTION

However, in the technology disclosed in Japanese Unexamined Patent Application Publication No. 2001-8285, since the sounds emitted from the central part of the screen are always extracted and enhanced, not only the voice but also the environmental sound emitted from any sound source in front of the screen are extracted. As a result, there are cases in which a target voice is not enhanced.

In the apparatus disclosed in Japanese Unexamined Patent Application Publication No. 2000-299842, the sounds from surrounding areas that are invisible in the image are also collected and the voice of a subject is not clearly collected if importance is attached to realism. In contrast, less realistic sounds are collected if importance is attached to the voice of the subject.

It is desirable to allow enhancement of a voice from a certain subject in an image that is captured.

According to an embodiment of the present invention, there is provided a signal processing apparatus processing a video signal and an audio signal in synchronization with the video signal. The signal processing apparatus includes generating means for generating information indicating a probability of a certain subject appearing in the image on the basis of the video signal that is input; determining means for determining whether the certain subject appears in the image on the basis of the information generated by the generating means; and directional characteristic varying means for, if the determining means determines that the certain subject appears in the image, varying a directional characteristic of the audio signal so as to increase the level of the audio signal collected from the direction of the subject and/or to decrease the levels of the audio signals collected from directions other than the direction of the subject.

The signal processing apparatus may further include frequency characteristic varying means for, if the determining means determines that the certain subject appears in the image, varying a frequency characteristic of the audio signal so as to increase the level of the frequency band including a sound emitted from the subject and/or to decrease the levels of frequency bands other than the frequency band including the sound emitted from the subject.

The generating means may include extracting means for extracting an area including the pixels of a certain color from the image corresponding to the input video signal; detecting means for detecting a characteristic value pattern of the pixels in the area extracted by the extracting means on the basis of a luminance or a color difference of the pixels in the area; storing means for storing in advance the characteristic value pattern detected from the image including the certain subject; and calculating means for comparing the characteristic value pattern detected by the detecting means with the characteristic value pattern stored in the storing means to calculate a correlation coefficient between the characteristic value patterns. The correlation coefficient calculated by the calculating means may be generated as the information indicating the probability of the certain subject appearing in the image.

The signal processing apparatus may further include image cropping means for cutting out a certain area in the image. The extracting means may extract the area including the pixels of the certain color from the certain area cut out by the image cropping means.

The certain subject may be a person. If the determining means determines that the person appears in the image, the directional characteristic varying means may vary the directional characteristic of the audio signal so as to increase the level of the audio signal collected from a forward direction and/or to decrease the levels of the audio signals collected from directions other than the forward direction, and the frequency characteristic varying means may vary the frequency characteristic of the audio signal so as to increase the level of the frequency band including the voice of the person and/or to decrease the levels of frequency bands other than the frequency band including the voice of the person.

The signal processing apparatus may further include setting means for setting a control level used for controlling the degree of the variation of the directional characteristic of the audio signal by the directional characteristic varying means or the degree of the variation of the frequency characteristic of the audio signal by the frequency characteristic varying means.

The setting means may normalize information indicating the size of the area extracted by the extracting means and may set the normalized information as the control level.

The setting means may normalize the correlation coefficient calculated by the calculating means and may set the normalized correlation coefficient as the control level.

The video signal and the audio signal subjected to the process in the directional characteristic varying means or the frequency characteristic varying means may be recorded on a recording medium by a recording unit.

The video signal and the audio signal may be output by a reproducing apparatus that reproduces the data recorded on the recording medium.

According to another embodiment of the present invention, there is provided a signal processing method for a signal processing apparatus processing a video signal and an audio signal in synchronization with the video signal. The signal processing method includes the steps of generating information indicating a probability of a certain subject appearing in the image on the basis of the video signal that is input; determining whether the certain subject appears in the image on the basis of the generated information; and varying, if it is determined that the certain subject appears in the image, a directional characteristic of the audio signal so as to increase the level of the audio signal collected from the direction of the subject and/or to decrease the levels of the audio signals collected from directions other than the direction of the subject.

According to yet another embodiment of the present invention, there is provided a program causing a signal processing apparatus that processes a video signal and an audio signal in synchronization with the video signal to perform signal processing. The program causes a computer to execute the steps of controlling generation of information indicating a probability of a certain subject appearing in the image on the basis of the video signal that is input; controlling determination of whether the certain subject appears in the image on the basis of the generated information; and controlling, if it is determined that the certain subject appears in the image, variation of a directional characteristic of the audio signal so as to increase the level of the audio signal collected from the direction of the subject and/or to decrease the levels of the audio signals collected from directions other than the direction of the subject.

According to further another embodiment of the present invention, there is provided a signal processing apparatus processing an audio signal associated with an image of a subject, captured by imaging means. The signal processing apparatus includes image receiving means for receiving the image of the subject; sound receiving means for receiving a sound; model storing means for storing characteristic value models of a plurality of subjects; characteristic value extracting means for extracting a characteristic value of the image of the subject; detecting means for comparing the characteristic value of the image of the subject, extracted by the characteristic value extracting means, with the characteristic value models stored in the model storing means to detect an image of a certain subject; and controlling means for, after the image of the certain subject is detected, enhancing a directional characteristic of the sound receiving means, which is associated with the detected image of the certain subject, and/or the level of a frequency band, which is associated with the image of the certain subject, or reducing the directional characteristic of the sound receiving means, which is not associated with the detected image of the certain subject, and/or the level of the frequency band, which is not associated with the image of the certain subject.

In the signal processing apparatus, the signal processing method, and the program according to the embodiments of the present invention, the information indicating the probability of a certain subject appearing in the image is generated on the basis of the video signal that is input and it is determined whether the certain subject appears in the image on the basis of the generated information. If it is determined that the certain subject appears in the image, the directional characteristic of the audio signal is varied so as to increase the level of the audio signal collected from the direction of the subject and/or to decrease the levels of the audio signals collected from directions other than the direction of the subject.

According to the present invention, it is possible to enhance a voice emitted from a certain subject in an image that is captured.

DESCRIPTION OF THE PREFERRED EMBODIMENTS

Figure 1:
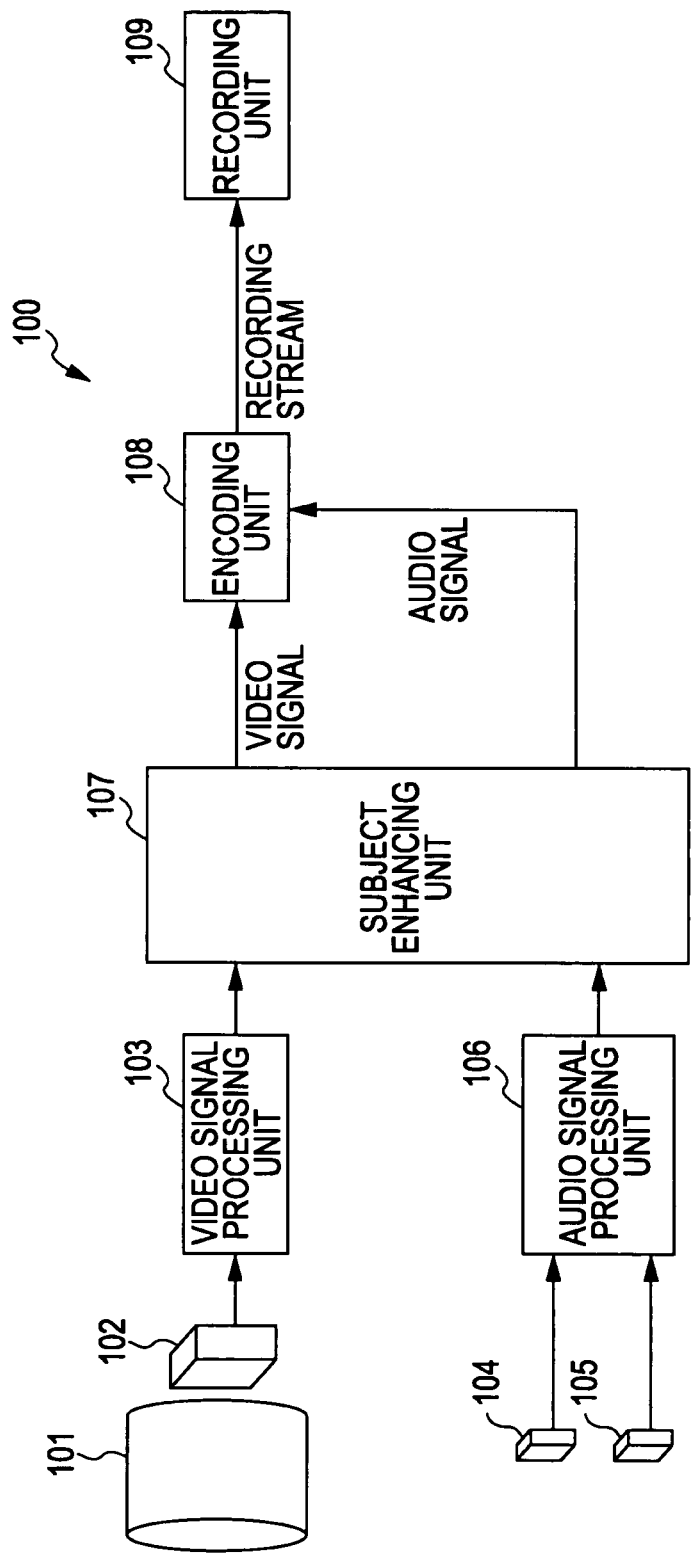
FIG. 1 is a block diagram showing an example of the structure of a video-audio recording apparatus according to an embodiment of the present invention.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A signal processing apparatus (for example, a subject enhancing unit 107 in FIG. 2), according to an embodiment of the present invention, processes a video signal and an audio signal in synchronization with the video signal. The signal processing apparatus includes generating means (for example, a image recognizing section 131 in FIG. 2) for generating information indicating a probability of a certain subject appearing in the image on the basis of the video signal that is input; determining means (for example, a determining section 132 in FIG. 2) for determining whether the certain subject appears in the image on the basis of the information generated by the generating means; and directional characteristic varying means (for example, a directivity controlling section 133 in FIG. 2) for, if the determining means determines that the certain subject appears in the image, varying a directional characteristic of the audio signal so as to increase the level of the audio signal collected from the direction of the subject and/or to decrease the levels of the audio signals collected from directions other than the direction of the subject.

The signal processing apparatus may further include frequency characteristic varying means (for example, a voice band controlling section 134 in FIG. 2) for, if the determining means determines that the certain subject appears in the image, varying a frequency characteristic of the audio signal so as to increase the level of the frequency band including a sound emitted from the subject and/or to decrease the levels of frequency bands other than the frequency band including the sound emitted from the subject.

In the signal processing apparatus, the generating means may include extracting means (for example, a color area extractor 162 in FIG. 3) for extracting an area including the pixels of a certain color from the image corresponding to the input video signal; detecting means (for example, a characteristic value extractor 163 in FIG. 3) for detecting a characteristic value pattern (for example, a histogram) of the pixels in the area extracted by the extracting means on the basis of a luminance or a color difference of the pixels in the area; storing means (for example, a model storage device 164 in FIG. 3) for storing in advance the characteristic value pattern detected from the image including the certain subject; and calculating means (for example, a pattern matcher 165 in FIG. 3) for comparing the characteristic value pattern detected by the detecting means with the characteristic value pattern stored in the storing means to calculate a correlation coefficient between the characteristic value patterns. The correlation coefficient calculated by the calculating means may be generated as the information indicating the probability of the certain subject appearing in the image.

The signal processing apparatus may further include image cropping means (for example, an image cropper 161 in FIG. 3) for cutting out a certain area (for example, an area in the central part of the screen) in the image. The extracting means may extract the area including the pixels of the certain color from the certain area cut out by the image cropping means.

The signal processing apparatus may further include setting means (for example, a level setting section 142) for setting a control level used for controlling the degree of the variation of the directional characteristic of the audio signal by the directional characteristic varying means or the degree of the variation of the frequency characteristic of the audio signal by the frequency characteristic varying means.

In the signal processing apparatus, the video signal and the audio signal subjected to the process in the directional characteristic varying means or the frequency characteristic varying means may be recorded on a recording medium by a recording unit (for example, a video-audio recording apparatus 100 in FIG. 1).

Figure 18:
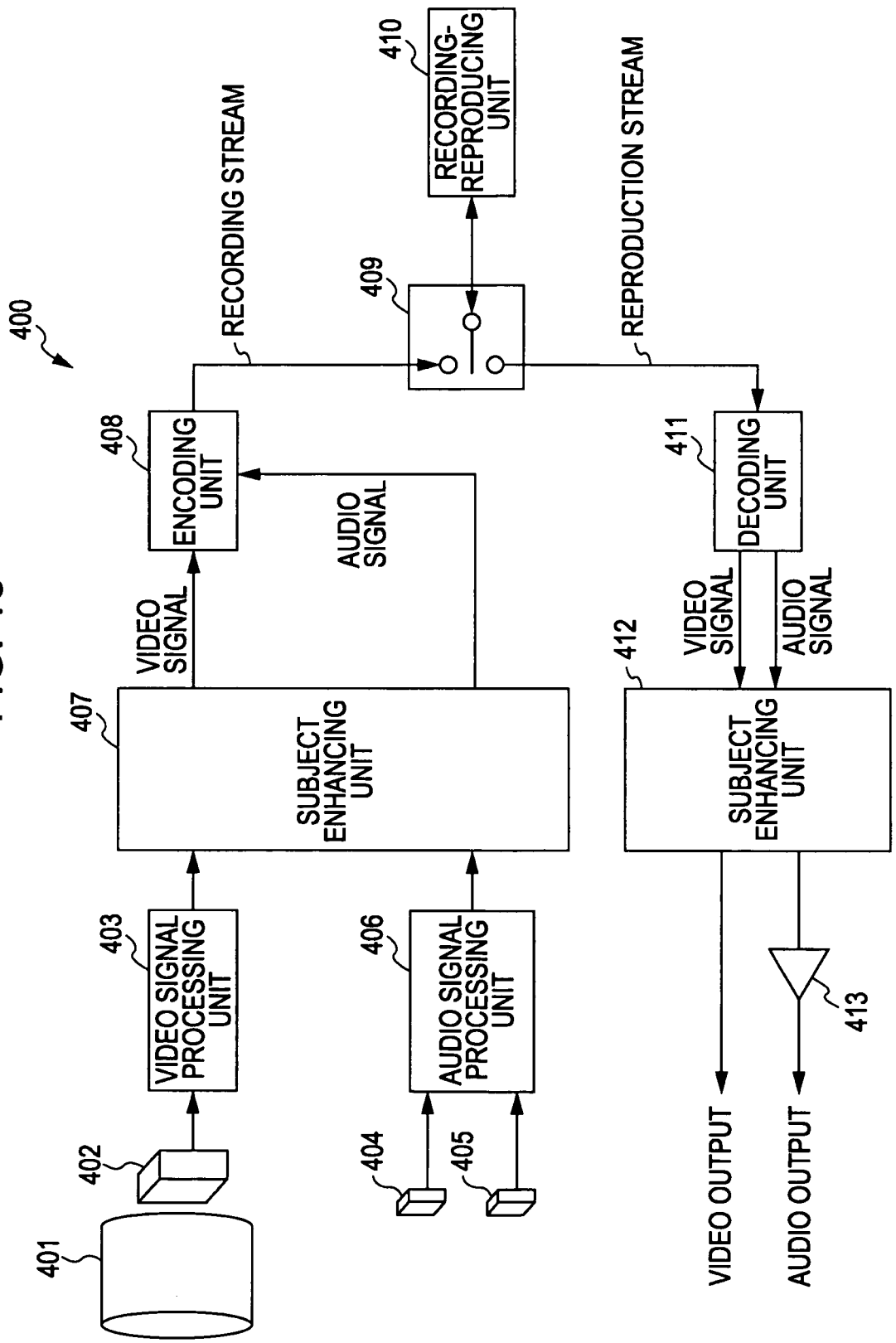
FIG. 18 is a block diagram showing an example of the structure of a video-audio recording-reproducing apparatus according to an embodiment of the present invention.

In the signal processing apparatus, the video signal and the audio signal may be output by a reproducing apparatus (for example, a video-audio recording-reproducing apparatus 400 in FIG. 18) that reproduces the data recorded on the recording medium.

Figure 11:
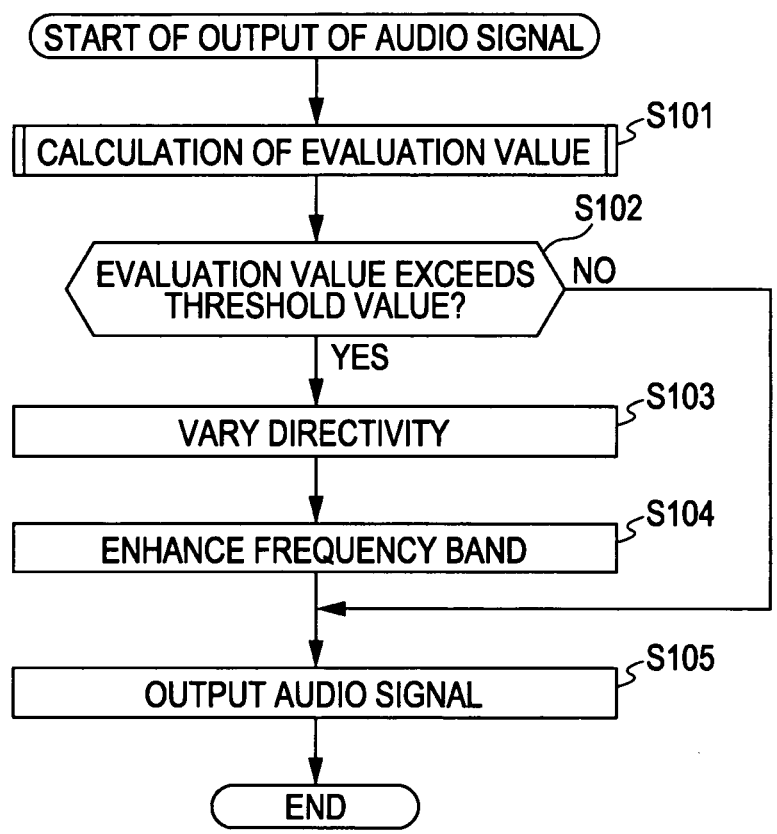
FIG. 11 is a flowchart showing an exemplary process of outputting the audio signal.

A signal processing method, according to another embodiment of the present invention, for a signal processing apparatus (for example, the subject enhancing unit 107 in FIG. 2) processing a video signal and an audio signal in synchronization with the video signal includes the steps of generating information indicating a probability of a certain subject appearing in the image on the basis of the video signal that is input (for example, in Step S101 in FIG. 11); determining whether the certain subject appears in the image on the basis of the generated information (for example, Step S102 in FIG. 11); and varying, if it is determined that the certain subject appears in the image, a directional characteristic of the audio signal so as to increase the level of the audio signal collected from the direction of the subject and/or to decrease the levels of the audio signals collected from directions other than the direction of the subject (for example, Step S103 in FIG. 11).

A program, according to another embodiment of the present invention, causes a signal processing apparatus (for example, the subject enhancing unit 107 in FIG. 2) processing a video signal and an audio signal in synchronization with the video signal to perform signal processing. The program causes a computer to execute the steps of controlling generation of information indicating a probability of a certain subject appearing in the image on the basis of the video signal that is input (for example, Step S101 in FIG. 11); controlling determination of whether the certain subject appears in the image on the basis of the generated information (for example, Step S102 in FIG. 11); and controlling, if it is determined that the certain subject appears in the image, variation of a directional characteristic of the audio signal so as to increase the level of the audio signal collected from the direction of the subject and/or to decrease the levels of the audio signals collected from directions other than the direction of the subject (for example, Step S103 in FIG. 11).

Embodiments of the present invention will be described with reference to the attached drawings.

FIG. 1 is a block diagram showing an example of the structure of a video-audio recording apparatus 100 according to an embodiment of the present invention.

The video-audio recording apparatus 100 is, for example, a video camera. The video-audio recording apparatus 100 records an image (video) on the basis of light condensed through a lens 101 and a sound collected through a microphone 104 or a microphone 105.

The light condensed through the lens 101 is converted into an electrical signal (photoelectric conversion) in accordance with the intensity of the light in an imaging device 102. The imaging device 102 is a photoelectric transducer, such as a charge coupled device (CCD) sensor or a complementary metal oxide semiconductor (CMOS) sensor.

A video signal processing unit 103 generates data on an RGB video signal on the basis of the data given by analog-to-digital conversion of the electrical signal output from the imaging device 102.

The signal of the sound collected through the microphone 104 or the microphone 105 is subjected to the analog-to-digital conversion in an audio signal processing unit 106. For example, the microphone 104 is provided so as to mainly collect the sound emitted from the front side of the video-audio recording apparatus 100 (video camera) and the microphone 105 is provided so as to mainly collect the sound emitted from the left and right sides of the video camera. The audio signal processing unit 106 generates audio data which corresponds to the audio signal input through the microphone 104 or the microphone 105 and to which data indicating that the sound is emitted from the front side of the video camera or that the sound is emitted from the left or right side thereof is added.

The data on the RGB video signal output from the video signal processing unit 103 and the audio data output from the audio signal processing unit 106 are supplied to a subject enhancing unit 107. The subject enhancing unit 107 checks whether a subject (for example, a person) desired by a user appears in the image captured by the video camera. If the person appears in the image captured by the video camera, the subject enhancing unit 107 enhances the voice that is emitted from the front side of the video camera and that is supposed to be emitted from the person. A detailed structure of the subject enhancing unit 107 will be described below.

The data on the video signal and the data on the audio signal, output from the subject enhancing unit 107, are supplied to an encoding unit 108. The encoding unit 108 performs a compression and encoding process to the input data on the video and audio signals in, for example, a moving picture experts group (MPEG) format to generate a recording stream and supplies the generated recording stream to a recording unit 109.

The recording unit 109 records the recording stream supplied from the encoding unit 108 on a recording medium, such as a digital versatile disk (DVD) or a hard disk drive (HDD).

Figure 2:
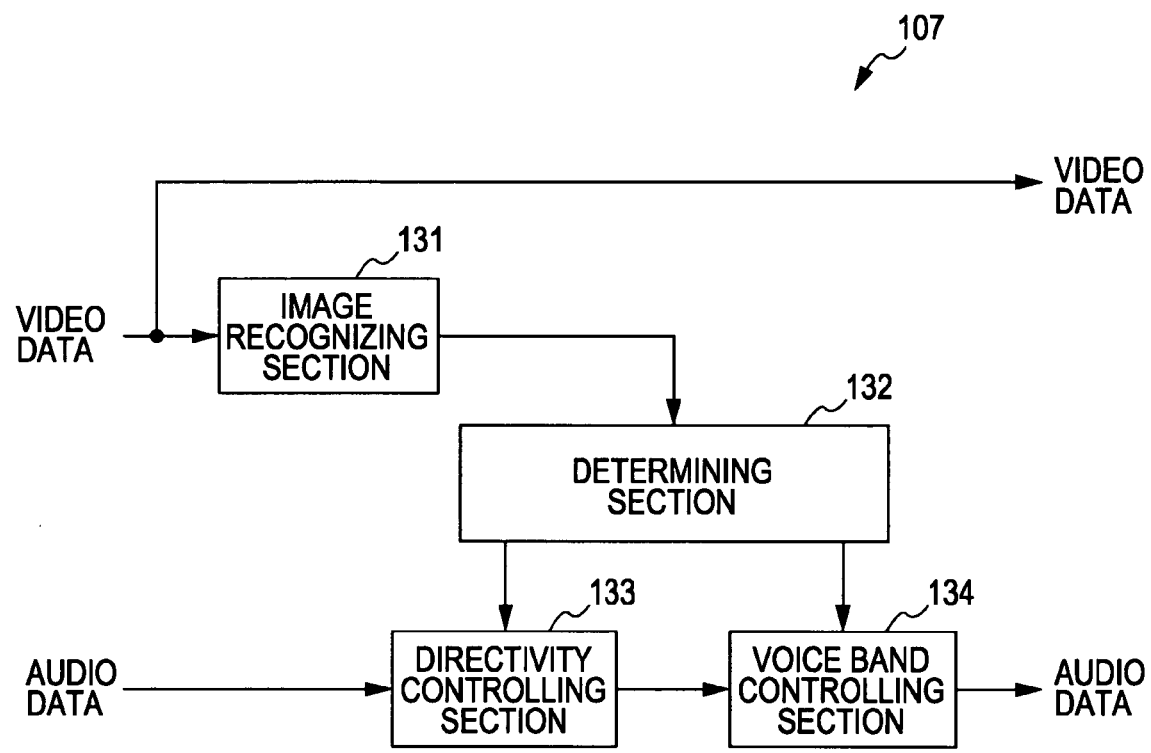
FIG. 2 is a block diagram showing an exemplary structure of a subject enhancing unit in FIG. 1 in detail.

FIG. 2 is a block diagram showing an exemplary structure of the subject enhancing unit 107 in detail. Referring to FIG. 2, an image recognizing section 131 calculates, on the basis of the data on the video signal supplied from the video signal processing unit 103, an evaluation value indicating the probability that a subject, such as a person, appears in the image captured by the video camera and supplies the calculated evaluation value to a determining section 132.

Figure 3:
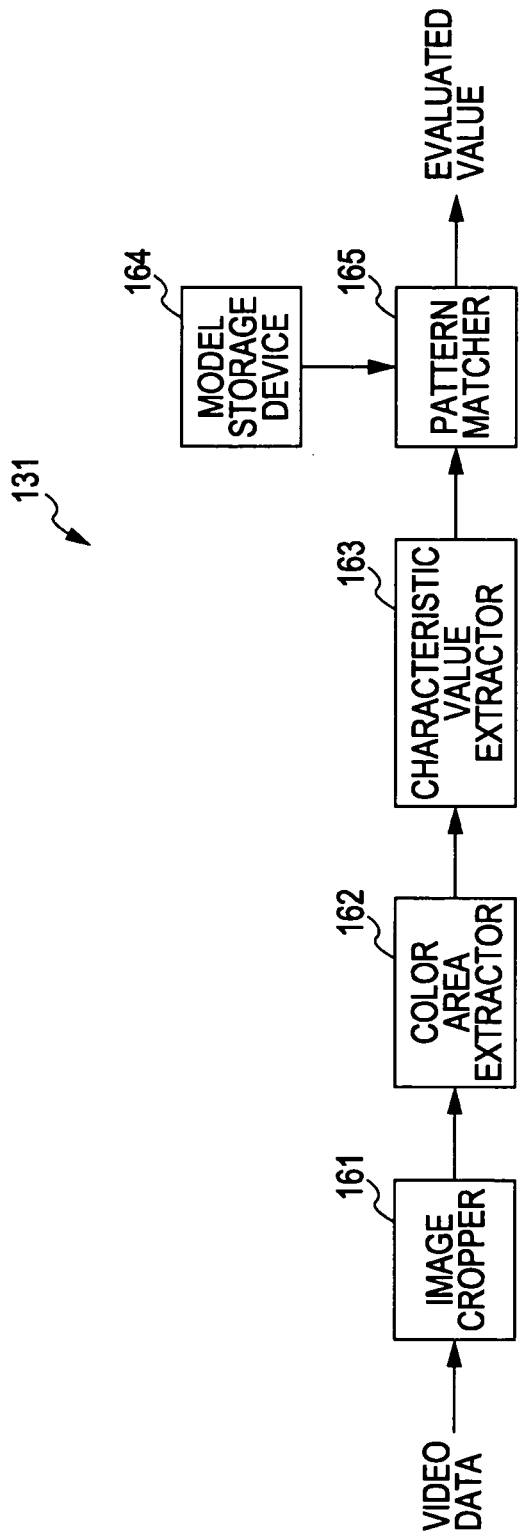
FIG. 3 is a block diagram showing an exemplary structure of an image recognizing section in FIG. 2 in detail.
Figure 4:
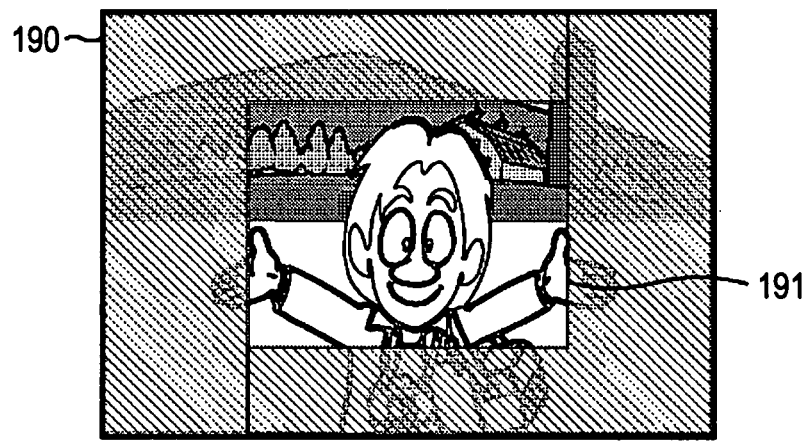
FIG. 4 shows an example of a window.

FIG. 3 is a block diagram showing an exemplary structure of the image recognizing section 131 in detail. Referring to FIG. 3, an image cropper 161 cuts out a predetermined area (for example, a central area) of the input image as a window. For example, as shown in FIG. 4, a window 191 in the central part of the screen, having longitudinal (vertical) and lateral (horizontal) dimensions smaller than those of an image 190 that is captured, is cut out from the image 190. In this example, a person appears in the captured image 190 and the area including the face of the person (a part that is not hatched) is cut out as the window 191.

Figure 5:
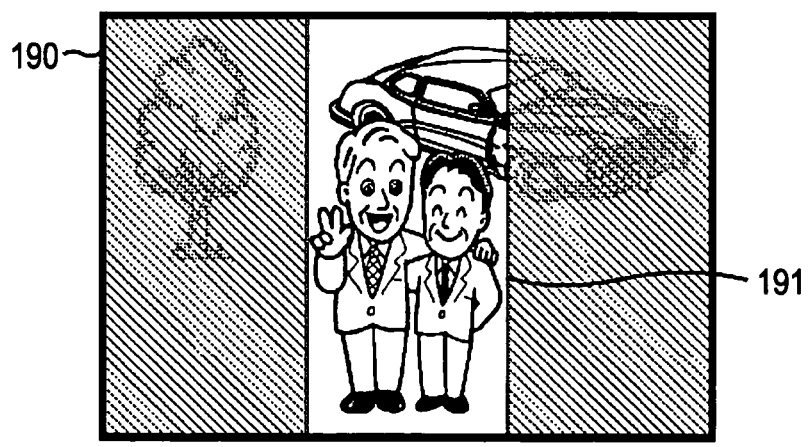
FIG. 5 shows another example of the window.

The window 191 may be cut out in a manner shown in FIG. 5. Referring to FIG. 5, the window 191 in the central part of the screen, having the same longitudinal dimension as that of the image 190 but having a lateral (horizontal) dimension smaller than that of the image 190, is cut out from the image 190. In this example, two persons appear in the central part of the captured image 190 and a part fully including the two persons in the image 190 is cut out as the window 191.

The window 191 having predetermined longitudinal and lateral dimensions may be cut out. Alternatively, the window 191 having longitudinal and lateral dimensions set by a user with an operational unit (not shown) may be cut out.

Referring back to FIG. 3, data about the pixels in the window 191 cut out by the image cropper 161 is supplied to a color area extractor 162. The color area extractor 162 converts the data about the pixels in the window 191, corresponding to the RGB signal, into luminance data and color-difference signal data according to the following equations. In the equations, "R", "G", and "B" denote values corresponding to "R", "G", and "B" components of the RGB signal, "Y" denotes a value of the luminance signal, and "Cr" and "Cb" denote values of the color difference signals.

$$Y=0.299R+0.587G+0.114B$$

$$Cr=0.701R-0.587G-0.114B$$

$$Cb=0.299R-0.587G+0.886B$$

The color area extractor 162 differentiates the pixel corresponding to the color of a certain subject from the other pixels on the basis of the luminance data and the color-difference signal data to binarize the data about the pixels in the window 191. For example, when a person is to be extracted as the certain subject, the color of each pixel is estimated on the basis of the luminance data and the color-difference signal data of the pixel. If the pixel corresponds to a flesh color being the color of the skin of the person, predetermined data indicating that the pixel is included in an area to be extracted is added to the pixel data to binarize the pixel data. If the pixel does not correspond to the flesh color, predetermined data indicating that the pixel is not included in the area to be extracted is added to the pixel data to binarize the pixel data.

A characteristic value extractor 163 calculates characteristic values of the data about the pixels in the area to be extracted, among the data about the pixels in the window 191 extracted (binarized) by the color area extractor 162. The characteristic values are calculated as a histogram on the basis of the density or brightness of the color of the pixels.

Figure 6:
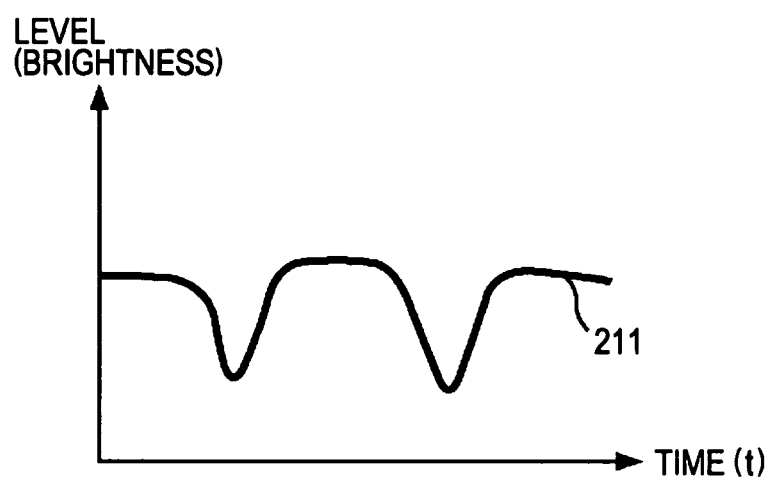
FIG. 6 is a graph showing an exemplary histogram generated by a characteristic value extractor in FIG. 3.

FIG. 6 is a graph showing an exemplary histogram generated on the basis of the density (brightness) of the pixels of the flesh color in the window 191 during a predetermined horizontal scanning period, when the face of a person is cut out as the window 191. The vertical axis represents the brightness of the pixels and the horizontal axis represents time in the horizontal direction of the screen. The histogram of the pixels is represented as a line 211. The characteristic value extractor 163 also generates a histogram of the pixels, on the basis of the brightness of the pixels and time in the vertical direction of the screen, during a predetermined vertical scanning period.

Referring back to FIG. 3, a pattern matcher 165 calculates a correlation coefficient representing the level of similarity between the histogram generated by the characteristic value extractor 163 and the histogram supplied from a model storage device 164.

The model storage device 164 has histogram patterns corresponding to the faces of human beings etc. stored therein. For example, a histogram shown by a line 212 in a graph in FIG. 7 is generated on the basis of the captured image of the face of a human being, and the generated histogram is stored in the model storage device 164.

Figure 7:
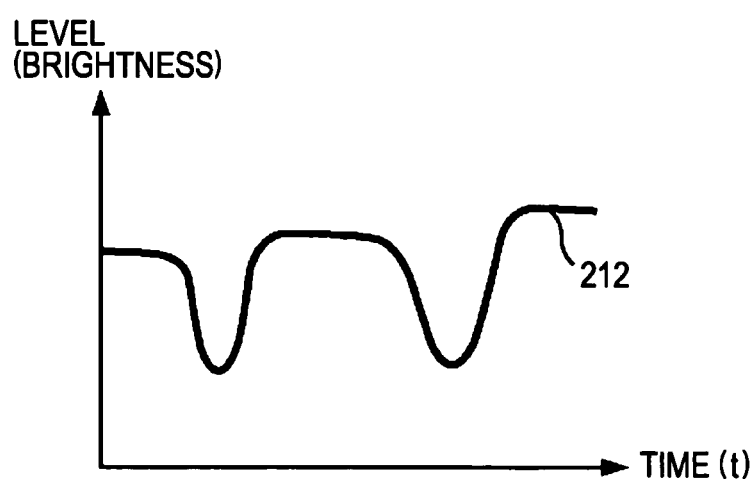
FIG. 7 is a graph showing an exemplary histogram stored in a model storage device in FIG. 3.

When the histogram that is shown by the line 211 in FIG. 6 and that is generated by the characteristic value extractor 163 is represented by a function A[t] and the histogram that is shown by the line 212 in FIG. 7 and that is supplied from the model storage device 164 is represented by a function B[t], the correlation coefficient ρ between the two histograms is calculated according to Formula 1.

[Formula 1]

$$\rho = \frac{\sum_{X=1}^{Y}(A[t] \cdot B[t])}{\sqrt{\sum_{t=X}^{Y}(A[t])^2 \cdot \sum_{t=X}^{Y}(B[t])^2}} \quad (1)$$

Referring back to FIG. 3, the pattern matcher 165 outputs the calculated value of the correlation coefficient ρ as an evaluation value. The evaluation value represents the level of similarity between the histogram generated by the characteristic value extractor 163 and the histogram supplied from the model storage device 164. The value of the correlation coefficient ρ comes close to "one" as the level of similarity becomes high. The value of the correlation coefficient ρ comes close to "zero" as the level of similarity becomes low.

Referring back to FIG. 2, the determining section 132 determines whether a certain subject (in this example, the face of a person) appears in the image captured by the video camera on the basis of the evaluation value supplied from the image recognizing section 131. For example, if the evaluation value supplied from the image recognizing section 131 exceeds a predetermined threshold value, the determining section 132 determines that the certain subject appears in the captured image and outputs a control signal used for controlling a directivity controlling section 133 and a voice band controlling section 134 in a manner described below.

The directivity controlling section 133 is a functional block that controls the directional characteristic of a sound supplied along with the image captured by the video camera. The directivity controlling section 133 varies the directional characteristic of the sound input through the microphone 104 or 105 on the basis of the control signal supplied from the determining section 132. The voice band controlling section 134 is a functional block that controls enhancement of a certain frequency band (for example, an increase of the level of a certain frequency band) in the sound supplied along with the image captured by the video camera. The voice band controlling section 134 varies the level of a certain frequency band in the sound that is collected, on the basis of the control signal supplied from the determining section 132.

Figure 8:
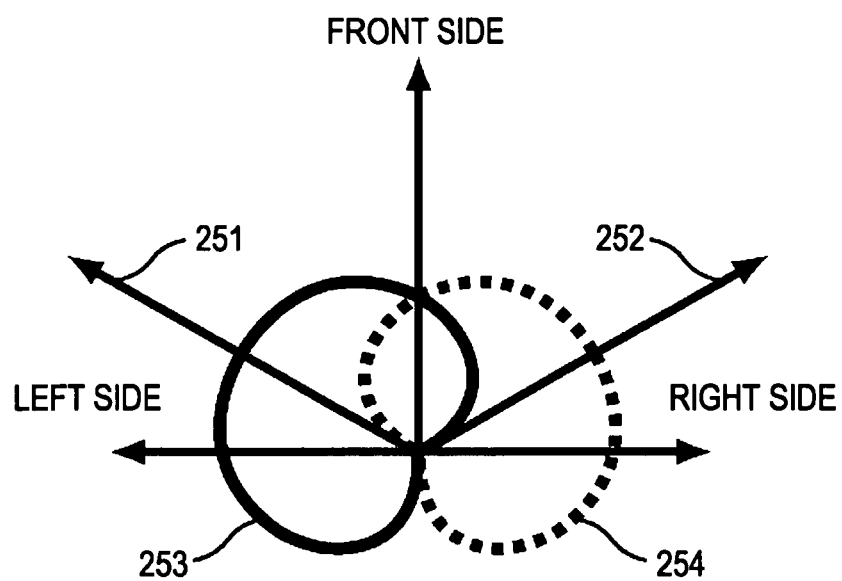
FIG. 8 shows an example of a directional characteristic (polar pattern) in the normal operation.

FIG. 8 shows an example of the directional characteristic (polar pattern) of the sound input through the microphone 104 or 105, set by the directivity controlling section 133, in the normal operation, that is, when the control signal is not supplied from the determining section 132. The upper side in FIG. 8 corresponds to the forward direction of the video camera and the left and right sides in FIG. 8 correspond to the left and right directions of the video camera, respectively. A solid line 253 and a broken line 254 form the polar pattern. The solid line 253 and the broken line 254 correspond to the collection levels of the sounds emitted from the directions of the solid line 253 and the broken line 254. For example, the solid line 253, having an arrow 251 corresponding to the left front direction of the video camera as the main axis of the directivity, and the broken line 254, having an arrow 252 corresponding to the right front direction of the video camera as the main axis of the directivity, form the polar pattern in which importance is attached to realism.

In other words, the directivity controlling section 133 sets the polar pattern around the arrows 251 and 252 such that the sounds emitted from the left front side and the right front side of the video camera are collected at a higher level, in the normal operation.

Figure 9:
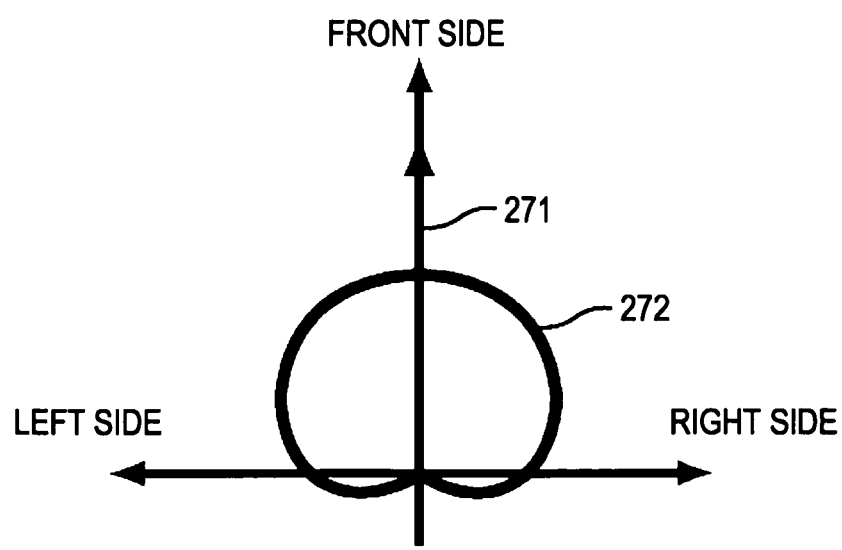
FIG. 9 shows an example of the directional characteristic (polar pattern) when a certain subject appears in the image captured by the video-audio recording apparatus.

FIG. 9 shows an example of the directional characteristic (polar pattern) of the sound input through the microphone 104 or 105, set by the directivity controlling section 133, when a certain subject appears in the image captured by the video camera, that is, when the control signal is supplied from the determining section 132. The upper side in FIG. 9 corresponds to the forward direction of the video camera and the left and right sides in FIG. 9 correspond to the left and right directions of the video camera, respectively. A solid line 272 represents the polar pattern. The solid line 272 corresponds to the collection level of the sound emitted from the direction of the solid line 272. For example, the solid line 272 having an arrow 271 corresponding to the forward direction of the video camera as the main axis of the directivity forms the polar pattern in which importance is attached to the subject in the central part of the captured image.

In other words, the directivity controlling section 133 sets the polar pattern around the arrow 271 such that the sound emitted from the front side of the video camera is collected at a higher level, when a certain subject appears in the image.

Consequently, in the normal operation (when an image of a landscape etc. is captured), it is possible to provide the realistic video and audio in which the sounds emitted from the left and right directions of the screen are clearly audible. When an image of a person etc. is captured, it is possible to provide the video and audio in which the voice emitted from the person in front side of the video camera is clearly audible.

Figure 10:
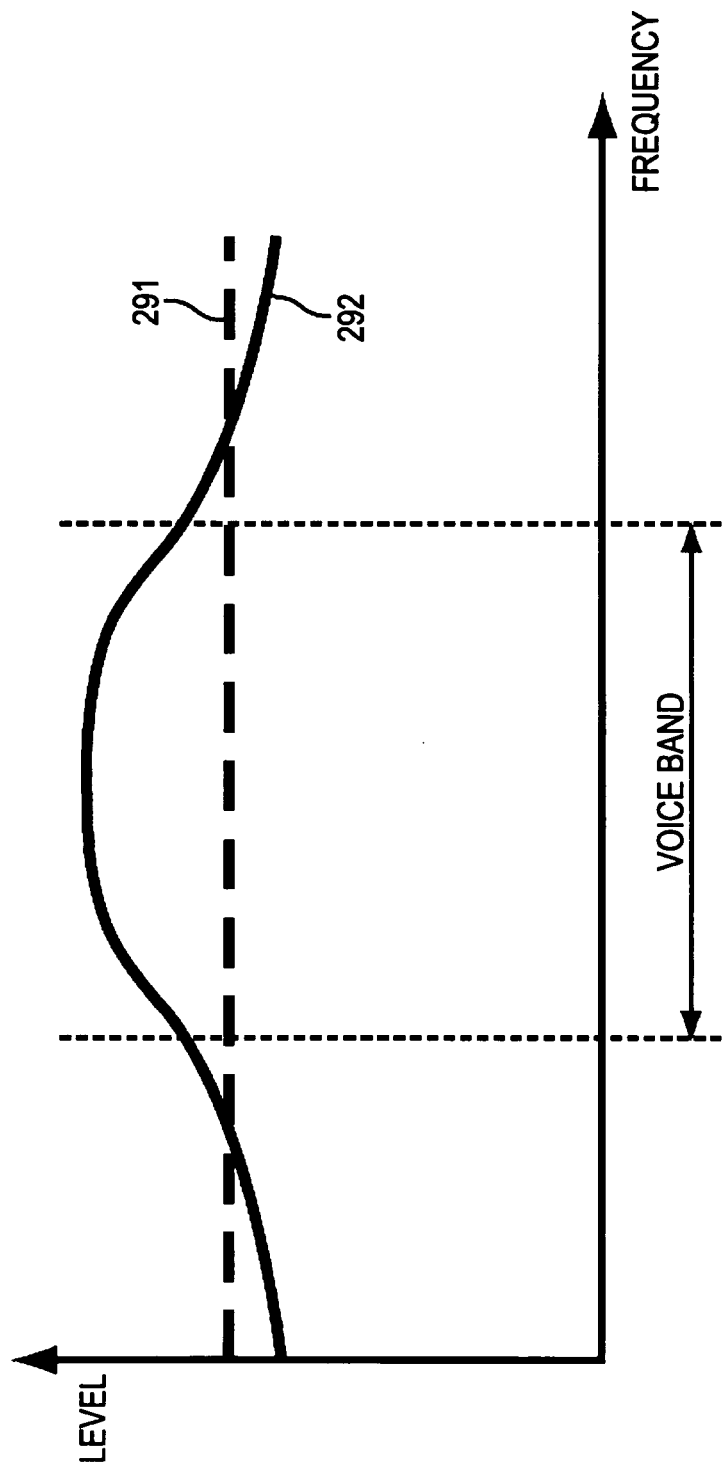
FIG. 10 shows examples of frequency characteristics of an audio signal output from a voice band controlling section in FIG. 2.

FIG. 10 shows examples of frequency characteristics of the audio signal output from the voice band controlling section 134. The vertical axis represents the frequency level and the horizontal axis represents frequency in FIG. 10.

The voice band controlling section 134 outputs the audio signal having a frequency characteristic shown by a dashed line 291 in the normal operation, that is, when the control signal is not supplied from the determining section 132. The level of dashed line 291 is substantially flat in the entire frequency band. With this frequency characteristic, the collected sound is output without being enhanced.

In other words, the voice band controlling section 134 outputs the collected sound without enhancing it when a certain subject (for example, a person) does not appear in the image.

In contrast, the voice band controlling section 134 outputs the audio signal having a frequency characteristic shown by a solid line 292 when a certain subject appears in the image captured by the video camera, that is, when the control signal is supplied from the determining section 132. The solid line 292 is increased in the level of the voice band and is decreased in the levels of the frequency bands other than the voice band, compared with the dashed line 291. With this frequency characteristic, the sounds having the frequencies in the voice band, among the collected sounds, are enhanced and the enhanced sounds are output. The voice band corresponds to the frequency band of the voices of human beings. For example, the voice band corresponds to a frequency band from 400 Hz to 4 kHz.

In other words, the voice band controlling section 134 enhances the voice band so that the voice emitted from the person is collected at a higher level when a certain subject (for example, a person) appears in the image.

Consequently, in the normal operation (when an image of a landscape etc. is captured), it is possible to provide the realistic video and audio in which the sounds emitted from all the objects (subjects) in the screen are clearly audible. When an image of a person etc. is captured, it is possible to provide the video and audio in which the voice emitted from the person is clearly audible.

FIG. 11 is a flowchart showing an exemplary process of outputting an audio signal, performed by the subject enhancing unit 107. This process is performed, for example, when video and audio is recorded by the video-audio recording apparatus 100 shown in FIG. 1.

Figure 12:
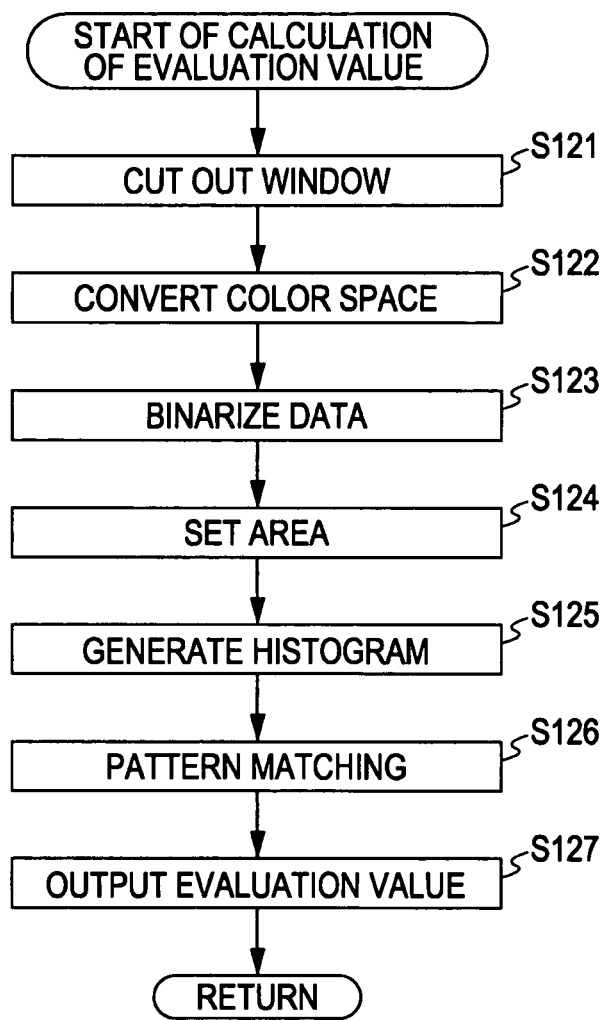
FIG. 12 is a flowchart showing an exemplary process of calculating an evaluation value.

In Step S101, the image recognizing section 131 performs a process of calculating an evaluation value, described below with reference to FIG. 12, to calculate an evaluation value.

The process of calculating an evaluation value in Step S101 in FIG. 11 will now be described in detail with reference to a flowchart shown in FIG. 12.

In Step S121, the image cropper 161 cuts out a window from the input image. As described above with reference to FIG. 4 or FIG. 5, for example, the window 191 is cut out from the image 190.

In Step S122, the color area extractor 162 converts the data on the pixels in the window 191, corresponding to the RGB signal, into luminance data and color-difference signal data to convert the color space of the image in the window that is cut out.

In Step S123, the color area extractor 162 differentiates the pixels corresponding to the color (for example, the flesh color) of a certain subject from the other pixels on the basis of the luminance data and the color-difference signal data to binarize the data on the pixels in the window 191.

In Step S124, the color area extractor 162 sets an area to be extracted (a flesh-color area in this case) on the basis of the binarized data in Step S123.

In Step S125, the characteristic value extractor 163 generates a histogram on the basis of the density or brightness of the color of the pixels in the area to be extracted, set in Step S124. For example, the histogram described above with reference to FIG. 6 is generated here.

In Step S126, the pattern matcher 165 performs pattern matching between the histogram generated in Step S125 and the histogram stored in the model storage device 164. As described above, the correlation coefficient indicating the level of similarity between the two histograms is calculated here.

In Step S127, the pattern matcher 165 outputs the evaluation value on the basis of the result of Step S126.

The evaluation value is calculated and output in the above manner.

Referring back to FIG. 11, after the process of calculating the evaluation value in Step S101 is terminated, in Step S102, the determining section 132 determines whether the evaluation value resulting from Step S101 exceeds a predetermined threshold value. If the evaluation value calculated in Step S101 exceeds the predetermined threshold value, it is estimated that a certain subject, for example, the face of a person, possibly appears in the window in the captured image.

If the determining section 132 determines in Step S102 that the evaluation value resulting from Step S101 exceeds the predetermined threshold value, the process proceeds to Step S103. In Step S103, the determining section 132 outputs the control signal and the directivity controlling section 133 varies the directional characteristic of the sound collected through the microphone 104 or 105. For example, as shown in FIG. 9, the polar pattern is set in which importance is attached to the subject in the central part of the captured image and in which the main axis of the directivity extends toward the forward direction of the video camera.

In other words, since the certain subject (person) appears in the image, the sound emitted from the front side of the video camera is set so as to be collected at a higher level.

In Step S104, the determining section 132 outputs the control signal and the voice band controlling section 134 increases the level of the voice band and decreases the levels of the frequency bands other than the voice band, as described above with reference to FIG. 10, to enhance the frequency band corresponding to the voice band.

In other words, since the certain subject (person) appears in the image, the voice of the person is set so as to be collected at a higher level.

In Step S105, the audio signal subjected to Step S103 in the directivity controlling section 133 and Step S104 in the voice band controlling section 134 is output.

If the determining section 132 determines in Step S102 that the evaluation value resulting from Step S101 does not exceed the predetermined threshold value, Steps S103 and S104 are skipped and the process proceeds to Step S105.

Since the certain subject (person) does not appear in the image, the sounds emitted from the left and right sides of the video camera are collected at a higher level and the audio signal is output without enhancing a certain frequency band in Step S105.

The audio signal is output from the subject enhancing unit 107 in the manner described above. Consequently, when an image of a landscape etc. is captured, it is possible to provide the realistic video and audio in which the sounds emitted from all the objects (subjects) in the screen are clearly audible. When an image of a person etc. is captured, it is possible to provide the video and audio in which the voice emitted from the person is clearly audible.

Although the audio signal is varied by the subject enhancing unit 107 in accordance with whether a certain subject (person) appears in the image in the above description, the audio signal may be varied stepwise by the subject enhancing unit 107. For example, the audio signal may be varied stepwise in accordance with the value of the correlation coefficient calculated by the pattern matcher 165 shown in FIG. 3.

Figure 13:
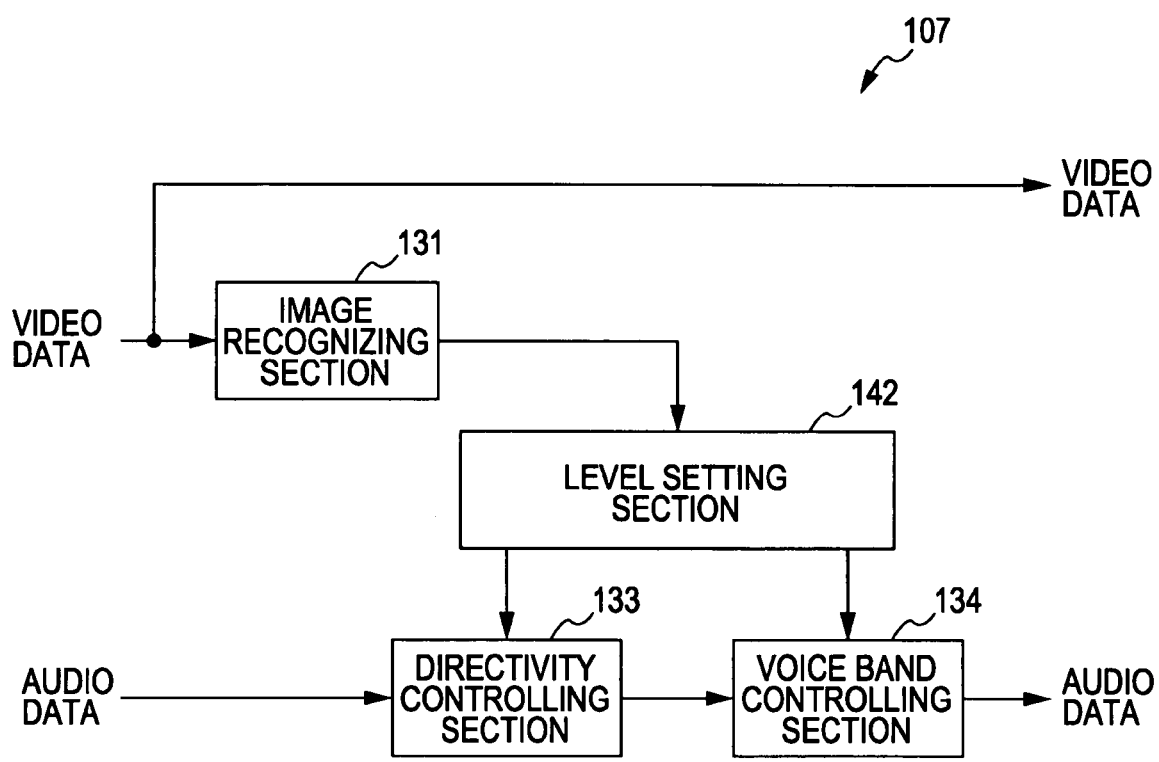
FIG. 13 is a block diagram showing another example of the structure of the subject enhancing unit in FIG. 1 in detail.

FIG. 13 is a block diagram showing an example of the structure of the subject enhancing unit 107 in detail when the audio signal is varied stepwise in accordance with the value of the correlation coefficient calculated by the pattern matcher 165. The same reference numerals are used in FIG. 13 to identify the same components shown in FIG. 2.

A level setting section 142 is provided in the example in FIG. 13, instead of the determining section 132 shown in FIG. 2. The level setting section 142 sets a control level used for controlling the directivity controlling section 133 and the voice band controlling section 134, on the basis of the evaluation value output from the image recognizing section 131. The level setting section 142 supplies the control level, for example, given by normalization of the evaluation value output from the image recognizing section 131 in association with ten control levels, to the directivity controlling section 133 and the voice band controlling section 134.

When the subject enhancing unit 107 has the structure shown in FIG. 13, the directivity controlling section 133 varies the directional characteristic (polar pattern) of the sound, input through the microphone 104 or 105, stepwise in accordance with the control level set by the level setting section 142.

Figure 14:
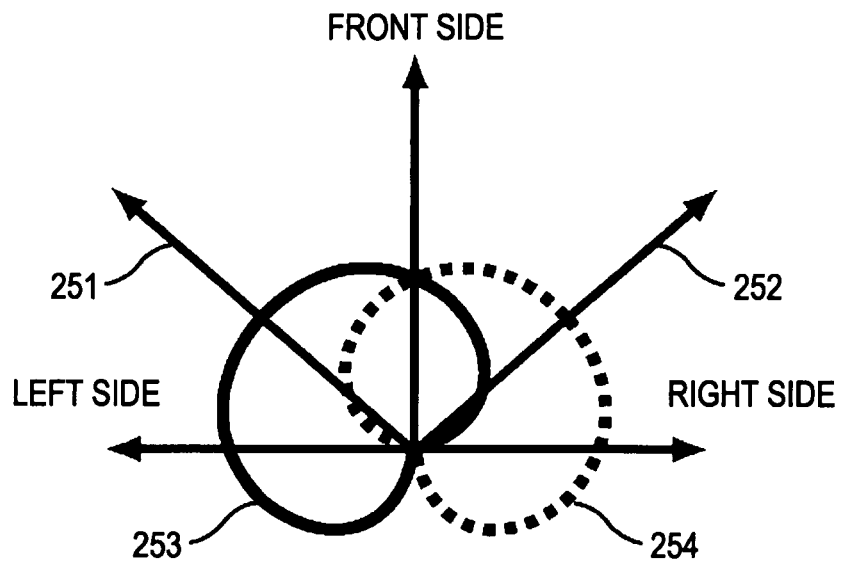
FIG. 14 shows an example of the directional characteristic (polar pattern) set by a directivity controlling section in FIG. 13.
Figure 15:
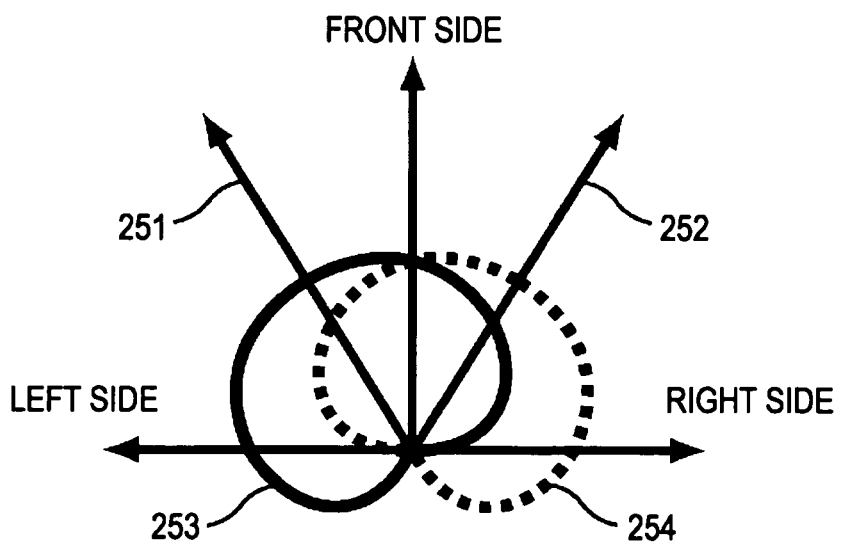
FIG. 15 shows another example of the directional characteristic (polar pattern) set by the directivity controlling section in FIG. 13.

FIGS. 14 and 15 show examples of the directional characteristics set in accordance with the control level set by the level setting section 142. As in the example shown in FIG. 8, the upper side in FIGS. 14 and 15 corresponds to the forward direction of the video camera and the left and right sides in FIGS. 14 and 15 correspond to the left and right directions of the video camera, respectively. Arrows 251 and 252 represent the main axes of the directivity. A solid line 253 and a broken line 254 form the polar pattern.

FIG. 14 shows an example of the directional characteristic (polar pattern), for example, when the control level is set to "one". The arrows 252 and 252, which represent the main axes of the directivity, come close to the forward direction of the video camera, compared with the polar pattern in the normal operation in FIG. 8. Specifically, the arrows 251 and 252 form a smaller angle with the forward direction of the video camera, compared with the example in FIG. 8. The polar pattern formed by the solid line 253 and the broken line 254 attaches more importance to the forward direction.

FIG. 15 shows an example of the directional characteristic (polar pattern), for example, when the control level is set to "two". The arrows 252 and 252, which represent the main axes of the directivity, come close to the forward direction of the video camera, compared with the example in FIG. 14. Specifically, the arrows 251 and 252 form a much smaller angle with the forward direction of the video camera, compared with the example in FIG. 14. The polar pattern formed by the solid line 253 and the broken line 254 attaches much more importance to the forward direction.

As described above, the directivity controlling section 133 sets the directional characteristic in which more importance is attached to the forward direction as the control level supplied from the level setting section 142 is increased. With this setting, it is possible to provide the video and audio in which the voice emitted from the person in the front side of the video camera is more clearly audible as the probability of the person appearing in the captured image is increased (the evaluation value is increased).

When the subject enhancing unit 107 has the structure shown in FIG. 13, the voice band controlling section 134 enhances the voice band stepwise, for example, in accordance with the control level set by the level setting section 142.

Figure 16:
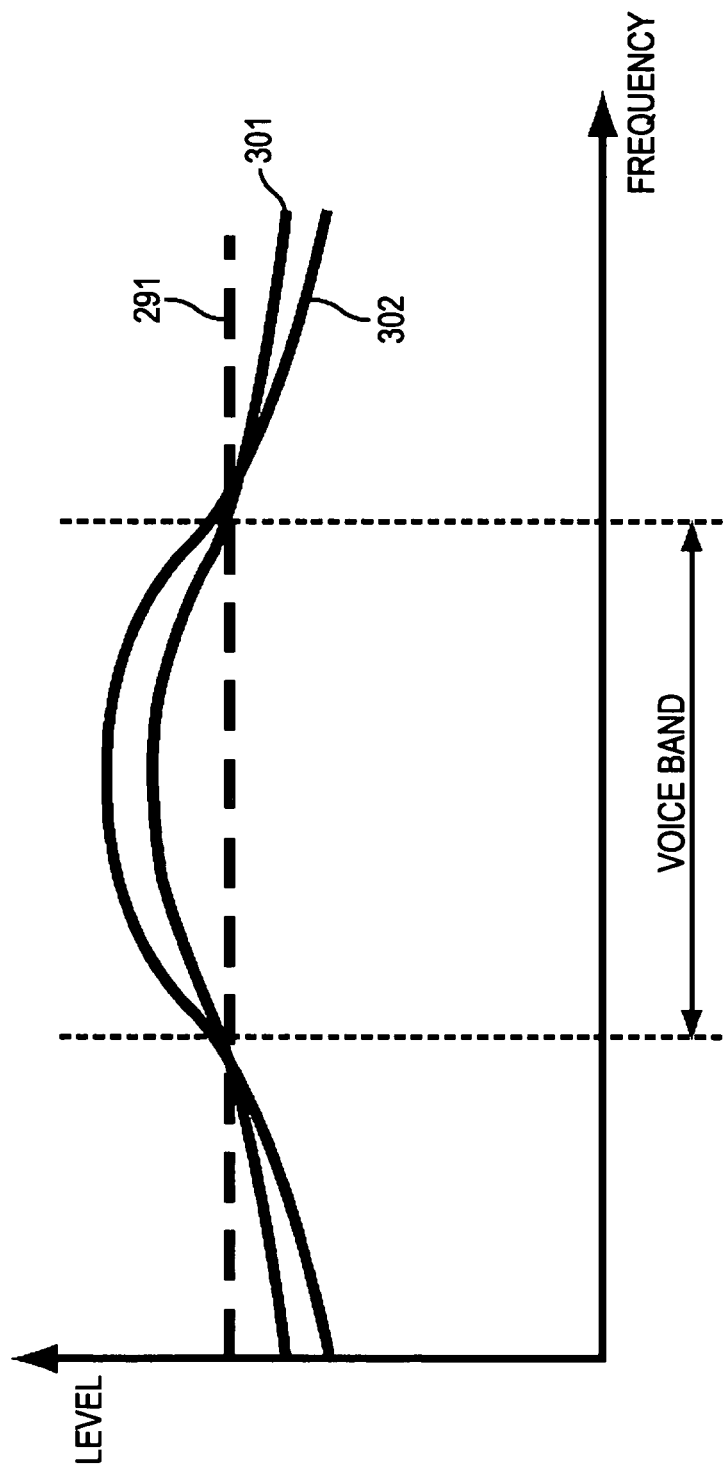
FIG. 16 shows examples of the frequency characteristics of the audio signal output from a voice band controlling section in FIG. 13.

FIG. 16 shows examples of frequency characteristics of the audio signal output from the voice band controlling section 134. The frequency characteristics vary in accordance with the control level set by the level setting section 142. The vertical axis represents the frequency level and the horizontal axis represents frequency in FIG. 16.

Referring to FIG. 16, the frequency characteristic shown by a solid line 301 is exhibited when the control level is set to "one". In this frequency characteristic, the frequencies in the voice band are enhanced, compared with a broken line 291 indicating the frequency characteristic in the normal operation.

The frequency characteristic shown by a solid line 302 is exhibited when the control level is set to "two". In this frequency characteristic, the frequencies in the voice band are further enhanced, compared with the frequency characteristic shown by the solid line 301.

As described above, the voice band controlling section 134 increases the level of the enhancement of the frequencies in the voice band as the control level set by the level setting section 142 is increased. With this setting, it is possible to provide the video and audio in which the voice emitted from the person is more clearly audible as the probability of the person appearing in the captured image is increased (the evaluation value is increased).

Although the example in which the level setting section 142 sets the control level in accordance with the evaluation value is described above, for example, information indicating the size of the area extracted by the color area extractor 162 may be supplied to the level setting section 142, along with the evaluation value calculated by the pattern matcher 165. The level setting section 142 may supply the control level, given by normalization of the information indicating the size of the area extracted by the color area extractor 162 in association with the ten control levels, to the directivity controlling section 133 and the voice band controlling section 134, for example, if the evaluation value exceeds the threshold value.

In this case, for example, when the person in the captured image is zoomed in, it is possible to provide the video and audio in which the voice emitted from the person is more clearly audible as the zoom-in level is increased (the extracted area is increased).

Figure 17:
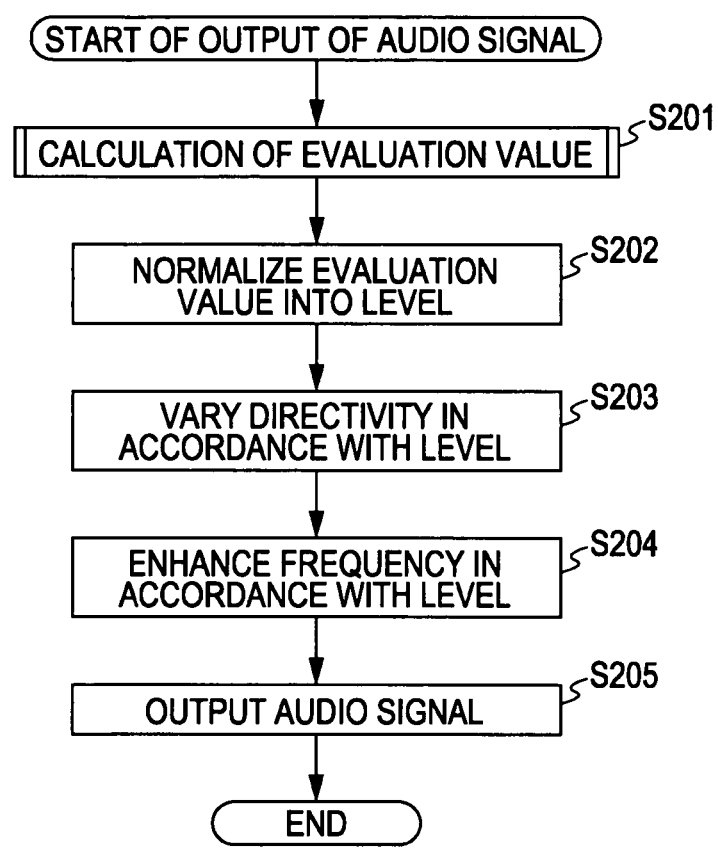
FIG. 17 is a flowchart showing another exemplary process of outputting the audio signal.

FIG. 17 is a flowchart showing an exemplary process of outputting an audio signal when the subject enhancing unit 107 has the structure shown in FIG. 13.

Since Step S201 is similar to Step S101 in FIG. 11, a detailed description is omitted herein.

In Step S202, the level setting section 142 normalizes the evaluation value calculated in Step S201 into, for example, the ten control levels and sets the control level. As described above, if the evaluation value exceeds the threshold value, the information indicating the size of the area extracted by the color area extractor 162 may be normalized in association with the ten control levels to set the control level.

In Step S203, the directivity controlling section 133 varies the directional characteristic in accordance with the control level set in Step S202. For example, the directional characteristic is varied stepwise, as described above with reference to FIGS. 14 and 15.

In Step S204, the voice band controlling section 134 enhances the frequencies in the voice band in accordance with the control level set in Step S202. For example, the frequencies in the voice band are varied stepwise, as described above with reference to FIG. 16.

In Step S205, the audio signal subjected to Step 203 in the directivity controlling section 133 and Step S204 in the voice band controlling section 134 is output.

The audio signal is output from the subject enhancing unit 107 in the manner described above. Consequently, when an image of a landscape etc. is captured, it is possible to provide the realistic video and audio in which the sounds emitted from all the objects (subjects) in the screen are clearly audible. When an image of a person etc. is captured, it is possible to provide the video and audio in which the voice emitted from the person is clearly audible in a stepwise manner in accordance with how the person appears in the image.

Although the enhancement of the voice of a certain subject in the video-audio recording apparatus 100, which is exemplified by a video camera, is described above, the enhancement of the voice of a certain subject may be performed in a video-audio reproducing apparatus, which is exemplified by a DVD player.

In this case, the subject enhancing unit 107 shown in FIG. 2 or FIG. 13 is incorporated in the video-audio reproducing apparatus that reproduces data recorded on, for example, a multi-channel DVD on which the sounds corresponding to multiple directional characteristics (for example, the directional characteristic in which importance is attached to the forward direction and the directional characteristic in which importance is attached to the left and right directions) are recorded in different channels. The subject enhancing unit 107 incorporated in the video-audio reproducing apparatus analyzes the reproduced video (image) in the manner described above with reference to FIG. 12. If a certain subject appears in the image, the sound emitted from the subject is enhanced in the manner described above with reference to FIG. 11 or FIG. 17.

However, the directivity controlling section 133 increases the output level of a certain channel to vary the directional characteristic so that the voice emitted from the subject is enhanced, instead of varying the directional characteristic of the sound input through the microphone.

The video-audio recording apparatus may be combined with the video-audio reproducing apparatus to form one apparatus (video-audio recording-reproducing apparatus). FIG. 18 is a block diagram showing an example of the structure of a video-audio recording-reproducing apparatus 400.

Since components from a lens 401 to an encoding unit 408 in FIG. 18 are similar to the components from the lens 101 to the encoding unit 108 in FIG. 1, a detailed description is omitted herein.

Referring to FIG. 18, the video-audio recording-reproducing apparatus 400 includes a switch 409. When video and audio is recorded, the switch 409 is switched so as to connect the encoding unit 408 to a recording-reproducing unit 410. The video-audio stream data output from the encoding unit 408 is recorded in a recording medium etc. in the recording-reproducing unit 410.

When video and audio is reproduced, the switch 409 is switched so as to connect a decoding unit 411 to the recording-reproducing unit 410. The compressed and encoded video-audio stream data, output from the recording-reproducing unit 410, is decoded by the decoding unit 411 and the data corresponding to the decoded video and audio signals is supplied to a subject enhancing unit 412.

The subject enhancing unit 412 has a structure similar to that of the subject enhancing unit 107 shown in FIG. 2 or FIG. 13. The subject enhancing unit 412 analyzes the data on the video signal supplied from the decoding unit 411 in the manner described above with reference to FIG. 12 and, if a certain subject appears in the image, enhances the voice emitted from the subject in the manner described above with reference to FIG. 11 or FIG. 17. However, unlike in the recording, in the reproduction, the sounds corresponding to multiple directional characteristics (for example, the directional characteristic in which importance is attached to the forward direction and the directional characteristic in which importance is attached to the left and right directions) are supplied to the subject enhancing unit 412 as the audio data in different channels, and the output level of a certain channel is increased to vary the directional characteristics so that the voice emitted from the subject is enhanced.

The audio signal output from the subject enhancing unit 412 is amplified by an amplifier 413 and the amplified audio signal is output from a speaker or the like (not shown).

With the above structure, both in the recording and in the reproduction, it is possible to provide the video and audio in which the voice emitted from a person is clearly audible when the person appears in the image.

The processes described above may be performed by hardware or software. If the above processes are performed by software, the programs forming the software is installed, over a network or from a recording medium, in a computer incorporated in dedicated hardware or in a general-purpose personal computer 500, shown in FIG. 19, capable of installing the programs to execute various functions.

Figure 19:
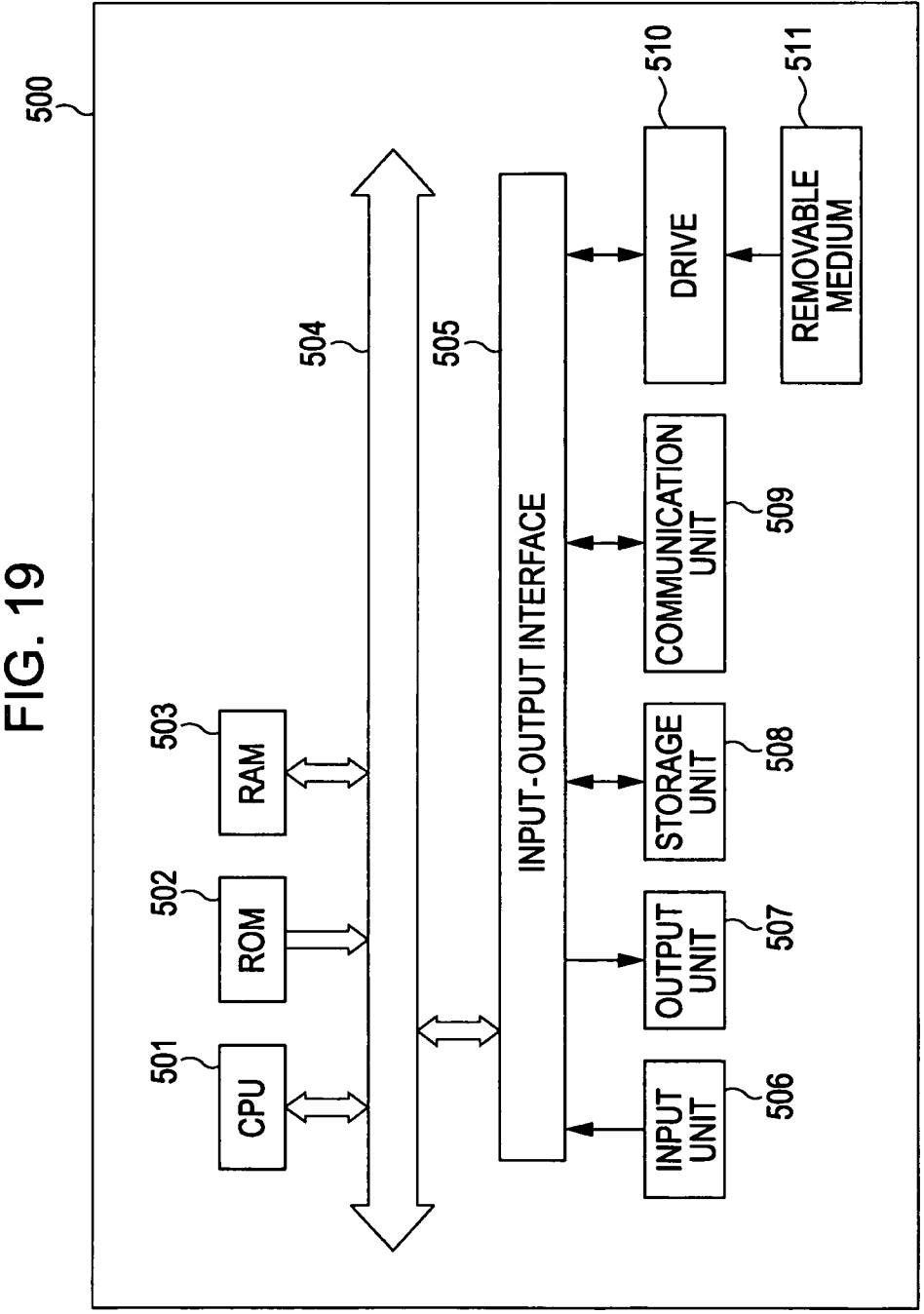
FIG. 19 is a block diagram showing an example of the structure of a personal computer.

Referring to FIG. 19, a central processing unit (CPU) 501 executes a variety of processing in accordance with programs stored in a read only memory (ROM) 502 or loaded from a storage unit 508 into a random access memory (RAM) 503. The RAM 503 also has data necessary for the CPU 501 to execute the variety of processing.

The CPU 501, the ROM 502, and the RAM 503 are connected to each other via a bus 504. An input-output interface 505 is also connected to the bus 504.

An input unit 506 including a keyboard and a mouse; an output unit 507 including a display, such as a cathode ray tube (CRT) or a liquid crystal display (LCD), and a speaker; the storage unit 508 including a hard disk; and a communication unit 509 including a modem and a network interface card, such as a local area network (LAN) card, are connected to the input-output interface 505. The communication unit 509 performs communication processing over a network including the Internet.

A drive 510 is connected to the input-output interface 505, if necessary. A removable medium 511, such as a magnetic disk, an optical disk, a magneto-optical disk, or a semiconductor memory, is appropriately loaded in the drive 510. The computer programs read out from the removable medium 511 are installed in the storage unit 508, if necessary.

When the above processes are performed by software, the programs forming the software are installed over the network including the Internet or from a recording medium, such as the removable medium 511.

The recording medium may be the removable medium 511 shown in FIG. 19, such as a magnetic disk (including a flexible disk), an optical disk (including a compact disk-read only memory (CD-ROM) and a DVD), a magneto-optical disk (including a MiniDisc (Registered Trademark of Sony Corporation)), or a semiconductor memory, which is separated from the apparatus, which is distributed in order to deliver the programs to a user, and which has the programs recorded therein. Alternatively, the recording medium may be the ROM 502 or the hard disk included in the storage unit 508, which is delivered to a user with being incorporated in the apparatus and which has the programs recorded therein.

The steps in the series of processes described above may be performed in time series in the described order or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus processing a video signal and an audio signal in synchronization with the video signal, the signal processing apparatus comprising:
   generating means for generating information indicating a probability of a certain subject appearing in an image on the basis of the video signal that is input, wherein the probability comprises a measure of the likelihood that the certain subject appears in the image;
   determining means for determining whether the certain subject appears in the image on the basis of the information generated by the generating means;
   directional characteristic varying means for, if the determining means determines that the certain subject appears in the image, varying a directional characteristic of the audio signal so as to increase the level of the audio signal collected from the direction of the subject and/or to decrease the levels of the audio signals collected from directions other than the direction of the subject; and
   frequency characteristic varying means for, if the determining means determines that the certain subject appears in the image, varying a frequency characteristic of the audio signal so as to increase the level of the frequency band including a sound emitted from the subject and/or to decrease the levels of frequency bands other than the frequency band including the sound emitted from the subject, wherein the generating means includes:
- extracting means for extracting an area including the pixels of a certain color from the image corresponding to the input video signal,
- detecting means for detecting a characteristic value pattern of the pixels in the area extracted by the extracting means on the basis of a luminance or a color difference of the pixels in the area,
- storing means for storing in advance the characteristic value pattern detected from the image including the certain subject, and
- calculating means for comparing the characteristic value pattern detected by the detecting means with the characteristic value pattern stored in the storing means to calculate a correlation coefficient between the characteristic value patterns, and wherein the correlation coefficient calculated by the calculating means is generated as the information indicating the probability of the certain subject appearing in the image.

2. The signal processing apparatus according to claim 1, further comprising image cropping means for cutting out a certain area in the image,
wherein the extracting means extracts the area including the pixels of the certain color from the certain area cut out by the image cropping means.

3. The signal processing apparatus according to claim 2, wherein the certain subject is a person, and
wherein, if the determining means determines that the person appears in the image, the directional characteristic varying means varies the directional characteristic of the audio signal so as to increase the level of the audio signal collected from a forward direction and/or to decrease the levels of the audio signals collected from directions other than the forward direction and the frequency characteristic varying means varies the frequency characteristic of the audio signal so as to increase the level of the frequency band including the voice of the person and/or to decrease the levels of frequency bands other than the frequency band including the voice of the person.

4. The signal processing apparatus according to claim 2, further comprising setting means for setting a control level used for controlling the degree of the variation of the directional characteristic of the audio signal by the directional characteristic varying means or the degree of the variation of the frequency characteristic of the audio signal by the frequency characteristic varying means.

5. The signal processing apparatus according to claim 4, wherein the setting means normalizes information indicating the size of the area extracted by the extracting means and sets the normalized information as the control level.

6. The signal processing apparatus according to claim 4, wherein the setting means normalizes the correlation coefficient calculated by the calculating means and sets the normalized correlation coefficient as the control level.

7. The signal processing apparatus according to claim 6, wherein the video signal and the audio signal subjected to the process in the directional characteristic varying means or the frequency characteristic varying means are recorded on a recording medium by a recording unit.

8. The signal processing apparatus according to claim 6, wherein the video signal and the audio signal are output by a reproducing apparatus that reproduces the data recorded on a recording medium.

9. A computer program product comprising a non-transitory computer readable medium including program code stored thereon causing a signal processing apparatus that processes a video signal and an audio signal in synchronization with the video signal to perform signal processing, the program code being executable to perform operations comprising:
- generating of information indicating a probability of a certain subject appearing in an image on the basis of the video signal that is input, wherein the probability comprises a measure of the likelihood that the certain subject appears in the image;
- determining of whether the certain subject appears in the image on the basis of the generated information;
- varying, if it is determined that the certain subject appears in the image, a directional characteristic of the audio signal so as to increase the level of the audio signal collected from the direction of the subject and/or to decrease the levels of the audio signals collected from directions other than the direction of the subject; and
- varying, if the determining means determines that the certain subject appears in the image, a frequency characteristic of the audio signal so as to increase the level of the frequency band including a sound emitted from the subject and/or to decrease the levels of frequency bands other than the frequency band including the sound emitted from the subject, wherein generating of the information includes:
- extracting an area including the pixels of a certain color from the image corresponding to the input video signal,
- detecting a characteristic value pattern of the pixels in the area extracted on the basis of a luminance or a color difference of the pixels in the area,
- storing in advance the characteristic value pattern detected from the image including the certain subject, and
- comparing the detected characteristic value pattern with the stored characteristic value pattern to calculate a correlation coefficient between the characteristic value patterns, and wherein the calculated correlation coefficient is generated as the information indicating the probability of the certain subject appearing in the image.

10. A signal processing apparatus processing an audio signal associated with an image of a subject, captured by imaging means, the signal processing apparatus comprising:
- image receiving means for receiving the image of the subject;
- sound receiving means for receiving a sound;
- model storing means for storing characteristic value models of a plurality of subjects;
- characteristic value extracting means for extracting a characteristic value of the image of the subject;
- detecting means for comparing the characteristic value of the image of the subject, extracted by the characteristic value extracting means, with the characteristic value models stored in the model storing means to detect an image of a certain subject; and
- controlling means for, after the image of the certain subject is detected, enhancing a directional characteristic of the sound receiving means, which is associated with the detected image of the certain subject, and/or the level of a frequency band, which is associated with the image of the certain subject, or reducing the directional characteristic of the sound receiving means, which is not associated with the detected image of the certain subject, and/or the level of the frequency band, which is not associated with the image of the certain subject.

11. A signal processing apparatus processing an audio signal associated with an image of a subject, captured by an imaging unit, the signal processing apparatus comprising:
   an image receiving unit receiving the image of the subject;
   a sound receiving unit receiving a sound;
   a model storing unit storing characteristic value models of a plurality of subjects;
   a characteristic value extracting unit extracting a characteristic value of the image of the subject;
   a detecting unit comparing the characteristic value of the image of the subject, extracted by the characteristic value extracting unit, with the characteristic value models stored in the model storing unit to detect an image of a certain subject; and
   a controlling unit enhancing, after the image of the certain subject is detected, a directional characteristic of the sound receiving unit, which is associated with the detected image of the certain subject, and/or the level of a frequency band, which is associated with the image of the certain subject, or reducing the directional characteristic of the sound receiving unit, which is not associated with the detected image of the certain subject, and/or the level of the frequency band, which is not associated with the image of the certain subject.

12. The signal processing apparatus according to claim 10, wherein the characteristic value extracting means extracts the characteristic value of the image of the subject by extracting an area including the pixels of a certain color from the image corresponding to the input video signal,
   wherein the detecting means compares the characteristic value of the image with the characteristic value models by detecting a characteristic value pattern of the pixels in the area extracted by the extracting means on the basis of a luminance or a color difference of the pixels in the area and comparing the characteristic value pattern detected by the detecting means with the characteristic value pattern stored in the model storing means to calculate a correlation coefficient between the characteristic value patterns, and
   wherein the correlation coefficient is generated as the information indicating a likelihood of the certain subject appearing in the image.

13. The signal processing apparatus according to claim 11, wherein the characteristic value extracting unit extracts the characteristic value of the image of the subject by extracting an area including the pixels of a certain color from the image corresponding to the input video signal,
   wherein the detecting unit compares the characteristic value of the image with the characteristic value models by detecting a characteristic value pattern of the pixels in the area extracted by the extracting unit on the basis of a luminance or a color difference of the pixels in the area and comparing the characteristic value pattern detected by the detecting unit with the characteristic value pattern stored in the model storing unit to calculate a correlation coefficient between the characteristic value patterns, and
   wherein the correlation coefficient is generated as the information indicating a likelihood of the certain subject appearing in the image.

* * * * *